(12) United States Patent
Shen et al.

(10) Patent No.: US 11,687,211 B2
(45) Date of Patent: Jun. 27, 2023

(54) SYSTEM AND METHOD FOR DOSSIER CREATION WITH LINKING DOSSIERS AND CONTEXT PASSING

(71) Applicant: MicroStrategy Incorporated, Tysons Corner, VA (US)

(72) Inventors: Ni Shen, Zhejiang (CN); Qiong Wu, Zhejiang (CN); Jeffrey Courcelle, Herndon, VA (US); Yingchun Mei, Zhejiang (CN); Xiaodi Zhong, Zhejiang (CN); Alejandro Olvera Velasco, Falls Church, VA (US)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 34 days.

(21) Appl. No.: 16/855,149

(22) Filed: Apr. 22, 2020

(65) Prior Publication Data
US 2021/0333951 A1 Oct. 28, 2021

(51) Int. Cl.
*G06F 3/0482* (2013.01)
*G06Q 10/10* (2023.01)
*G06F 16/26* (2019.01)

(52) U.S. Cl.
CPC ............ *G06F 3/0482* (2013.01); *G06F 16/26* (2019.01); *G06Q 10/10* (2013.01)

(58) Field of Classification Search
CPC ........ G06F 3/0482; G06F 16/26; G06F 16/94; G06F 40/134; G06Q 10/10
USPC ......................................................... 715/810
See application file for complete search history.

(56) References Cited

U.S. PATENT DOCUMENTS

| | | | | |
|---|---|---|---|---|
| 2003/0182303 A1* | 9/2003 | Gibson | ................... | G06F 16/26 |
| 2006/0026122 A1* | 2/2006 | Hurwood | ............... | G06Q 10/10 |
| 2008/0163099 A1* | 7/2008 | Gu | ........................ | G06Q 30/02 |
| | | | | 715/780 |
| 2011/0173680 A1* | 7/2011 | Bates | ..................... | G06Q 10/10 |
| | | | | 726/4 |
| 2014/0053091 A1* | 2/2014 | Hou | .................... | G06F 3/04883 |
| | | | | 715/769 |
| 2014/0108985 A1* | 4/2014 | Scott | ..................... | G05B 15/02 |
| | | | | 715/771 |
| 2015/0143211 A1* | 5/2015 | Kaufthal | .............. | G06F 40/134 |
| | | | | 715/205 |
| 2015/0294013 A1* | 10/2015 | Ozer | ..................... | G06Q 50/06 |
| | | | | 707/754 |
| 2016/0103592 A1* | 4/2016 | Prophete | ............... | G06Q 10/10 |
| | | | | 715/771 |
| 2016/0103903 A1* | 4/2016 | Vivalda | ................. | H04L 65/403 |
| | | | | 709/204 |
| 2017/0083589 A1* | 3/2017 | Pominville | ......... | G06F 16/2228 |
| 2019/0302969 A1* | 10/2019 | Kim | ........................ | G06F 9/451 |
| 2019/0332360 A1* | 10/2019 | Chauhan | ................... | G06F 8/38 |

(Continued)

*Primary Examiner* — Dino Kujundzic
*Assistant Examiner* — Jianmei F Duckworth
(74) *Attorney, Agent, or Firm* — Muncy, Geissler, Olds & Lowe, P.C.

(57) ABSTRACT

A method (and system) includes retrieving a dataset from a database, creating a source report including a graphical representation of the dataset, the graphical representation of the dataset including a data container, displaying the report on a graphical user interface and creating a contextual link between the graphical representation of the dataset and another graphical representation of data within the report or within another separate report.

12 Claims, 18 Drawing Sheets

(56) References Cited

U.S. PATENT DOCUMENTS

2021/0141359 A1\* 5/2021 Tappan .............. G05B 23/0216
2021/0182309 A1\* 6/2021 Qiu ..................... G06F 3/04847

\* cited by examiner

SYSTEM AND METHOD FOR DOSSIER CREATION WITH LINKING DOSSIERS AND CONTEXT PASSING

BACKGROUND OF THE INVENTION

Field of the Invention

The present invention generally relates to a method and system for displaying data, and more particularly to a method and system for creating business analytic reports with data linking and context passing between separate reports.

Description of the Related Art

Large databases are common in business today. Indeed, the amount of data available to business organizations today is rapidly increasing. Thus, a challenge for many organizations is to find a way to timely sort and present all relevant information while filtering unnecessary information.

In reporting systems, such as decision support systems, business intelligence systems and on-line analytical processing (OLAP) systems, data sorting and extraction are used to retrieve and present data in an efficient manner. Additionally, the reporting systems provide a means for a user to clearly and creatively present an interactive visualization of the relevant data.

Specifically, dossier building systems and programs or report system services documents (RSD) exists in which users can create a dashboard or canvas having one more datasets displayed in different containers. The data sets in each container display an interactive visualization of user selected data (e.g., a table, graph, pie chart, etc.). Particularly, a RSD contains datasets from one or more reports. The data is positioned and formed into a single visual representation of the data that can be presented to a user. The datasets can be displayed in a document or a RSD dashboard. When a user creates a document, report, dossier, visualization, or dashboard, the user specifies the data that appears. Furthermore, the user can control the layout, formatting and grouping of the data.

In current report or dashboard building systems, designers are able to build multiple dossiers.

Currently (i.e., before contextual dossier-to-dossier linking existed), dossier authors would need to build all of the content in different pages of the same dossier. The authors could not have contextual linking from one dossier to another dossier.

Another problem is that it is a common business practice to separate analytical content by division (e.g., sales, HR, services, etc.), type of analysis (sales, inventory, providers, customers, etc.), or by level of granularity (e.g. Regional Sales>Store-level sales), which often requires creating separate dossier objects. During an analytics workflow of an end-user, however, this provides a disjointed experience, since users could not easily navigate from one dossier to another while keeping their filtering context.

Related to above, before contextual dossier-to-dossier linking was possible, it was more difficult to enable "drill-down" scenarios, since the same dossier would need to include a larger dataset that contained all the information at the desired level of granularity (e.g., store level), which indeed can cause performance problems as well due to the mere size of the dataset required to host the data and the necessary joins and aggregation of the data to display it at higher levels of analysis (e.g., region level), which can also affect the response time.

Currently, there is solution to meaningfully link the multiple, separate dossiers within a same project to create an application workflow. Thus, dossier performance can become degraded due to the necessity to include multiple datasets within one file (dossier object) to enable the desired workflows with the current page-to-page linking with context capability.

SUMMARY OF THE INVENTION

In view of the foregoing and other exemplary problems, drawbacks, and disadvantages of the conventional methods and structures, an exemplary feature of the present invention is to provide a method and system for generating reports, which provides the ability to select data on a visualization and link to another dossier passing that selection. This feature allows a user to narrow down the amount of data and, thus, increase productivity.

In a first, exemplary, non-limiting aspect of the present invention, a method includes retrieving a dataset from a database, creating a source report including a graphical representation of the dataset, the graphical representation of the dataset including a data container, displaying the report on a graphical user interface and creating a contextual link between the graphical representation of the dataset and another graphical representation of data within the report or within another separate report.

In a second, exemplary, non-limiting aspect of the present invention, a non-transitory computer processor-readable storage medium storing instructions is configured for execution by a computer for retrieving a dataset from a database, creating a source report including a graphical representation of the dataset, the graphical representation of the dataset including a data container, displaying the report on a graphical user interface and creating a contextual link between the graphical representation of the dataset and another graphical representation of data within the report or within another separate report.

In a third, exemplary, non-limiting aspect of the present invention, a system includes a database storing a dataset, a processor configured to: create a source report including a graphical representation of the dataset, the graphical representation of the dataset including a data container; and create a contextual link between the graphical representation of the dataset and another graphical representation of data within the report or within another separate report, and a graphical user interface configured to display the report.

In accordance with the above, exemplary aspects of the present invention, a method and system are provided in which a user is able to create a contextual link between different pages of a report/dossier or between multiple, separate dossiers/reports. When the link is created, not only is a link between the data created, but also the context (e.g., filtering criteria and prompt criteria) related to the data. Accordingly, a user is able to narrow down the amount of data and, thus, increase productivity.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
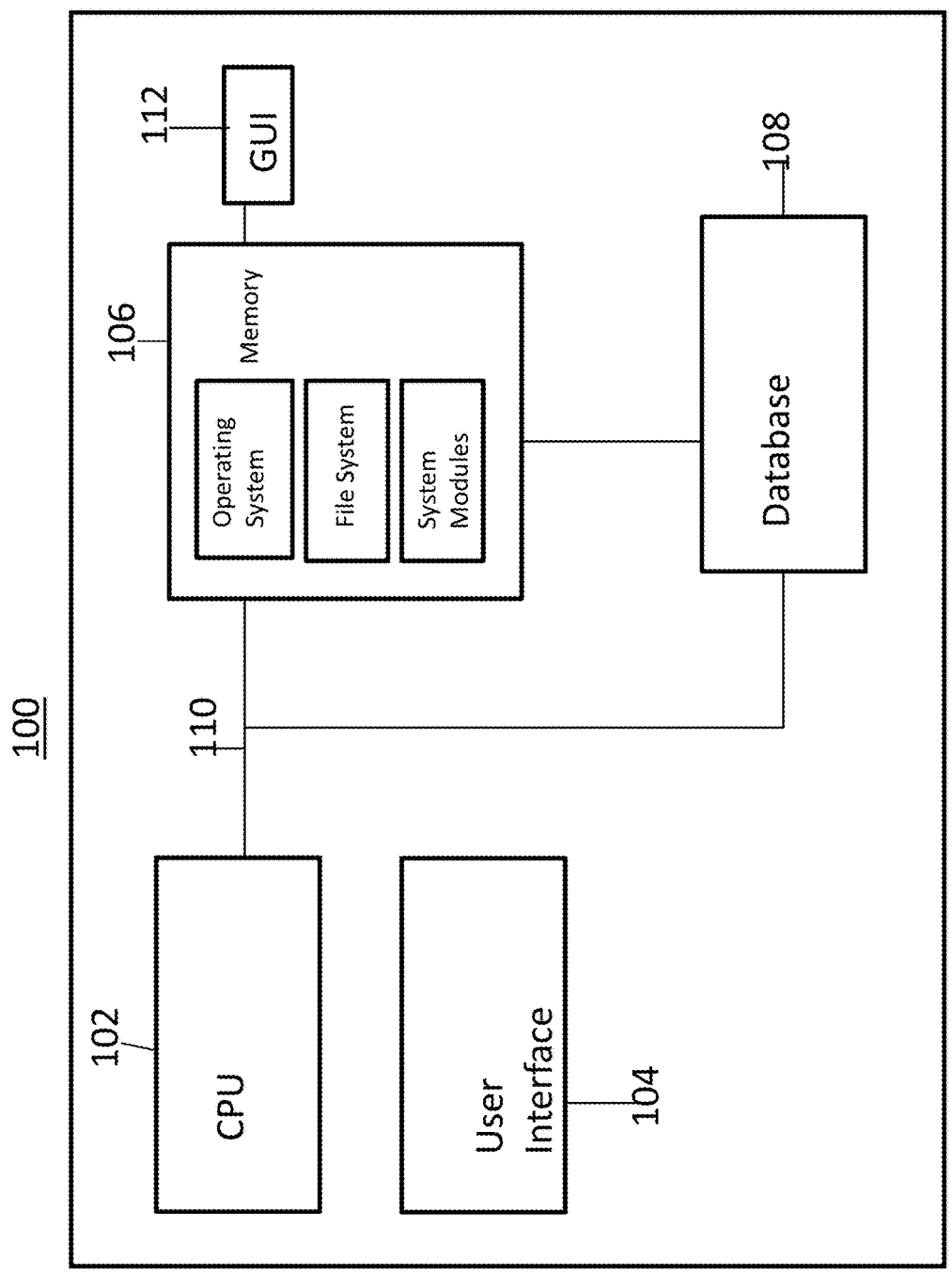
FIG. 1 illustrates a system 100 according to certain exemplary embodiments of the present invention.

Referring now to the drawings, and more particularly to FIGS. 1-17, there are shown exemplary embodiments of the method and structures according to the present invention.

FIG. 1 is a block diagram illustrating a system 100 according certain exemplary aspects of the invention. Specifically, the system 100 is configured to create reports/documents/dossiers including a visualization of one or more datasets. As is illustrated in FIG. 1, the system 100 includes a CPU 102 having a user interface 104 (e.g., mouse, keyboard, touch screen, etc.). The CPU 102 is connected to a memory 106, storing an operating system, file system and computer system modules configured to perform the method of the present invention (e.g., process data and generate reports), and a database 108, storing one or more datasets, by a system bus 110. The system 100 includes a graphical user interface (GUI) 112 configured to receive and display a generated report.

Figure 2:
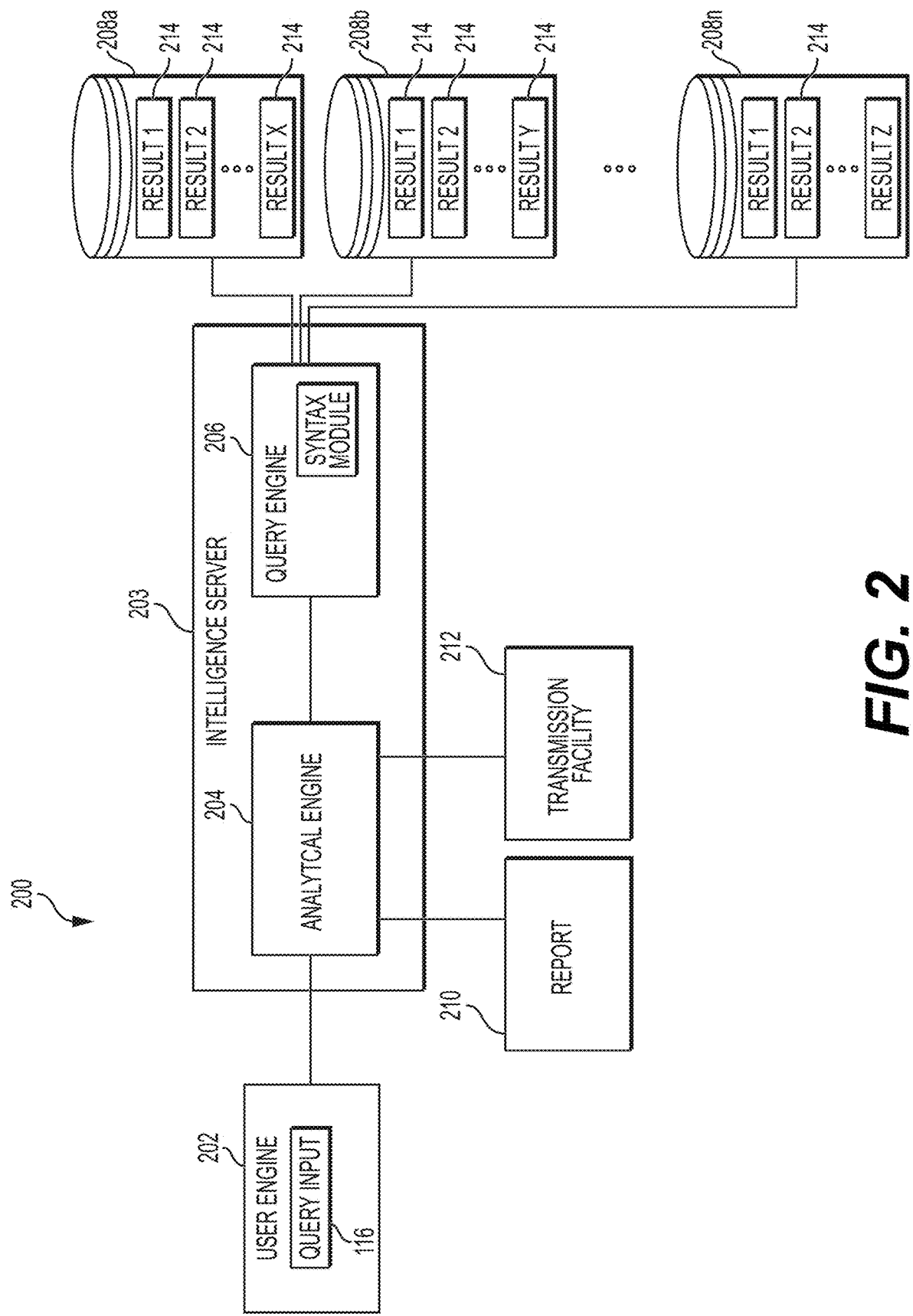
FIG. 2 illustrates a system 200 according to certain exemplary embodiments of the present invention.

FIG. 2 further defines elements of the system in accordance with certain exemplary embodiments of the present invention. Specifically, FIG. 2 is a block diagram illustrating a system 200 by which a variety of data resources may be accessed for business analytic, report generation and other intelligence purposes according to an embodiment of the invention. According to certain exemplary embodiments of the invention, the system 200 may comprise an online analytical processing (OLAP) decision support system (DSS). In particular, FIG. 2 may comprise a portion of the Microstrategy platform, which provides a preferred system in which the present invention may be implemented.

In general, through using the system 200 of the invention, analysts, managers and other users may query or interrogate a plurality of databases or database arrays to extra demographic, sales and/or financial data and information and other patterns from records stored in such databases or database arrays to identify strategic trends. The strategic trends may not be discernable without processing the queries and treating the results of the data extraction according to the techniques performed by the systems and methods of the invention. This is in part because the size and complexity of some data portfolios stored in such databases or database arrays may mask those trends.

In addition, the system 200 may enable the creation of reports or services that are processed according to a schedule. Users may then subscribe to the service, provide personalization criteria and have the information automatically delivered to the user.

As illustrated in FIG. 2, a business, government, user or other organization may access the resources of the system 200 using a user engine 202. The user engine 202 may include a query input module 216 to accept a plurality of searches, queries or other requests, via a query box or on a graphical user interface (GUI) or another similar interface. The user engine 202 may communicate with an analytical engine 204. The analytical engine 204 may include a set of extensible modules to run a plurality of statistical analyses, to apply filtering criteria, to perform a neural net technique or another technique to condition and treat data extracted from data resources hosted in the system 200, according to a query received from the user engine 202.

The analytical engine 204 may communicate with a query engine 206, which in turn interfaces to one or more data storage devices 208a, 208b . . . 208n (where n is an arbitrary number). The data storage devices 208a, 208b . . . 208n may include or interface to a relational database or another structured database stored on a hard disk, an optical disk, a solid state device or another similar storage media. When implemented as databases, the data storage devices 208a, 208b . . . 208n may include or interface to, for example, an Oracle™ relational database such as sold commercially by Oracle Corporation, an IBM Informix™ database, a Database 2 (DB2) database, a Teradata database, or another data storage device or query format, platform or resource such as an OLAP format, a Standard Query Language (SQL) format, a storage area network (SAN), or a Microsoft Access™ database. It should be understood that while data storage devices 208a, 208b . . . 208n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a macOS operating system, a Windows™ 10 operating system, a Unix operating system, or a a Linux operating system, or a server running an Oracle Solaris™ operating system, a macOS, Red Hat, Ubuntu or other Linux-based server operating systems. According to one embodiment of the present invention, the analytical engine 304 and the query engine 306 may comprise elements of an intelligence server 303.

The data storage devices 208a, 208b . . . 208n may be supported by a server or another resource and may, in some embodiments, include redundancy, such as a redundant array of independent disks (RAID), for data protection. The storage capacity of any one or more of the data storage devices 208a, 208b . . . 208n may be of various sizes, from relatively small datasets to very large database (VLDB)-scale datasets, such as warehouses holding terabytes of data or more. The fields and types of data stored within the data storage devices 208a, 208b . . . 208n may also be diverse, and may include, for instance, financial, personal, news, marketing, technical, addressing, governmental, military, medical or other categories of data or information.

The query engine 206 may mediate one or more queries or information requests from those received from the user at the user engine 202 to parse, filter, format and otherwise process such queries to be submitted against the data contained in the data storage devices 208a, 208b . . . 208n. Thus, a user at the user engine 202 may submit a query requesting information in SQL format, or have the query translated to SQL format. The submitted query is then transmitted via the analytical engine 204 to the query engine 206. The query engine 206 may determine, for instance, whether the transmitted query may be processed by one or more resources of the data storage devices 208a, 208b . . . 208n in its original format. If so, the query engine 206 may directly transmit the query to one or more of the resources of the data storage devices 208*a*, 208*b* . . . 208*n* for processing.

If the transmitted query cannot be processed in its original format, the query engine 206 may perform a translation of the query from an original syntax to a syntax compatible with one or more of the data storage devices 208*a*, 208*b* . . . 208*n* by invoking a syntax module 218 to conform the syntax of the query to standard SQL, DB2, IBM Informix™, Teradata formats or to other data structures, syntax or logic.

The query engine 206 may likewise parse the transmitted query to determine whether it includes any invalid formatting or to trap other errors included in the transmitted query, such as a request for sales data for a future year or other similar types of errors. Upon detecting an invalid or an unsupported query, the query engine 206 may pass an error message back to the user engine 202 to await further user input.

When a valid query such as a search request is received and conformed to a proper format, the query engine 206 may pass the query to one or more of the data storage devices 208*a*, 208*n* . . . 208*n* for processing. In some embodiments, the query may be processed for one or more hits against one or more databases in the data storage devices 208*a*, 208*b* . . . 208*n*. For example, a manager of a restaurant chain, a retail vendor or another similar user may submit a query to view gross sales made by the restaurant chain or retail vendor in the State of New York for the year 1999. The data storage devices 208*a*, 208*b* . . . 208*n* may be searched for one or more fields corresponding to the query to generate a set of results 214.

Although illustrated in connection with each data storage device 208 in FIG. 1, the results 214 may be generated from querying any one or more of the databases of the data storage devices 208*a*, 208*b* . . . 208*n*, depending on which of the data resources produce hits from processing the search query. In some embodiments of the system 200 of the invention, the results 214 may be maintained on one or more of the data storage devices 208*a*, 208*b* . . . 208*n* to permit one or more refinements, iterated queries, joinders or other operations to be performed on the data included in the results 214 before passing the information included in the results 214 back to the analytical engine 204 and other elements of the system 200.

When any such refinements or other operations are concluded, the results 214 may be transmitted to the analytical engine 204 via the query engine 206. The analytical engine 204 may then perform statistical, logical or other operations on the results 214 for presentation to the user. For instance, in the State of New York reached $1 M in sales at the earliest time in the year 2019. Or, the user may submit a query asking for an average, a mean and a standard deviation of an account balance on a portfolio of credit or other accounts.

The analytical engine 204 may process such queries to generate a quantitative report 210, which may include a table or other output indicating the results 214 extracted from the data storage devices 208*a*, 208*b* . . . 208*n*. The report 210 may be presented to the user via the user engine 202, and, in some embodiments, may be temporarily or permanently stored on the user engine 202, a client machine or elsewhere, or printed or otherwise output. In some embodiments of the system 200 of the invention, the report 210 or other output may be transmitted to a transmission facility 212, for transmission to a set of personnel via an email, an instant message, a text-to-voice message, a video or via another channel or medium. The transmission facility 212 may include or interface to, for example, a personalized broadcast platform or service. Similarly, in some embodiments of the invention, more than one user engine 202 or other client resource may permit multiple users to view the report 210, such as, for instance, via a corporate intranet or over the Internet using a Web browser. Various authorization and access protocols may be employed for security purposes to vary the access permitted users to such report 210 in such embodiments.

Additionally, an administrative level user may create a report as part of a service. Subscribers/users may then receive access to reports through various types of data delivery devices including telephones, email, wireless communication devices, mobile phones, tablets, and many others. In addition, subscribers may specify trigger conditions so that the subscriber receives a report only when that condition has been satisfied. The platform of FIG. 2 may have many other uses, as described in detail with respect to the MicroStrategy platform, the details of which will be appreciated by one of ordinary skill in the reporting and decision support system art.

Figure 3:
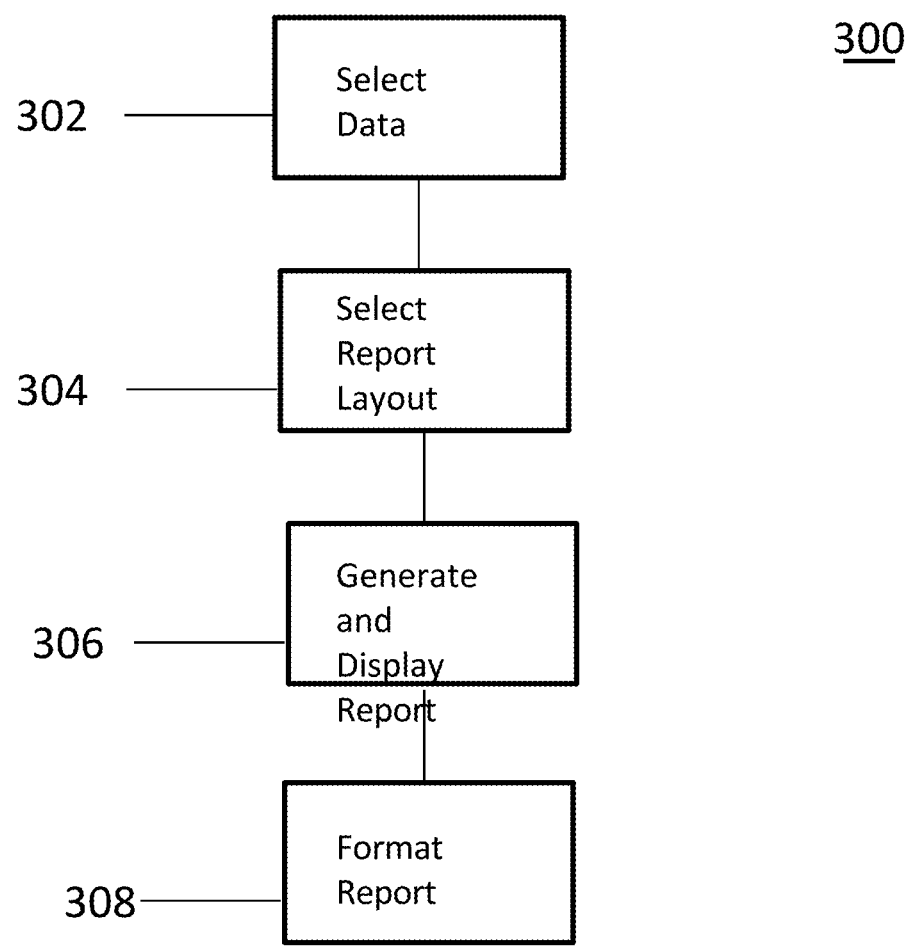
FIG. 3 illustrates a method 300 according to certain exemplary embodiments of the present invention.

FIG. 3 illustrates a basic flow chart of a method 300 for generating a report according to certain exemplary embodiments of the invention. At step 302, the system receives a request from a user for selecting one or more specific datasets from the database/data storage devices. At step 304, the user selects a report layout 304. At step 306, the system generates and displays the report based on the selected layout and selected dataset(s). At step 308, the user formats the layout and specific containers included in the layout.

Figure 4:
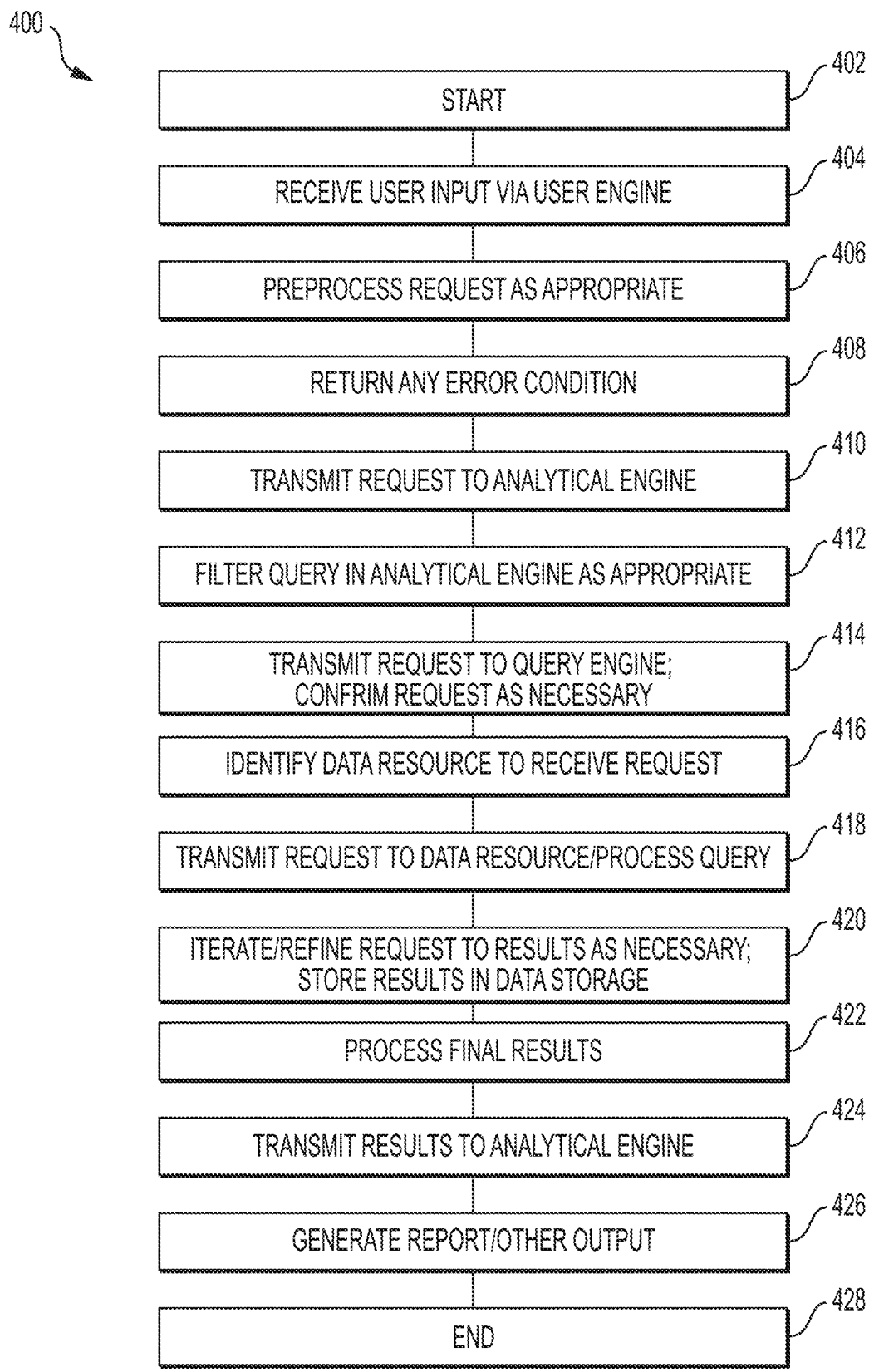
FIG. 4 illustrates a method 400 according to certain exemplary embodiments of the present invention.

The specific steps performed in a method 400 for generating a report according to certain exemplary embodiments of the present invention are illustrated in the flowchart of FIG. 4. In step 402, the method 400 begins. In step 404, the user may supply input, such as a query or a request for information, via the user engine 202. In step 406, the user input query may be preliminarily processed, for instance, to determine whether it includes valid fields and for other formatting and error-flagging issues. In step 408, any error conditions may be trapped and an error message presented to the user, for correction of the error conditions. In step 410, if a query is in a valid format, the query may then be transmitted to the analytical engine 204.

In step 412, the analytical engine 204 may further process the input query as appropriate to ensure the intended results 214 may be generated to apply the desired analytics. In step 414, the query engine 206 may further filter, format and otherwise process the input query to ensure that the query is in a syntax compatible with the syntax of the data storage devices 208*a*, 208*b* . . . 208*n*. In step 416, one or more appropriate databases or other resources within the data storage devices 208*a*, 208*b* . . . 208*n* may be identified to be accessed for the given query.

In step 418, the query may be transmitted to the data storage devices 208*a*, 208*b* . . . 208*n* and the query may be processed for hits or other results 214 against the content of the data storage devices 208*a*, 208*b* . . . 208*n*. In step 420, the results 214 of the query may be refined, and intermediate or other corresponding results 214 may be stored in the data storage devices 208*a*, 208*b* . . . 208*n*. In step 422, the final results 214 of the processing of the query against the data storage devices 208*a*, 208*b* . . . 208*n* may be transmitted to the analytical engine 204 via the query engine 206. In step 424, a plurality of analytical measures, filters, thresholds, statistical or other treatments may be run on the results 214. In step 426, a report 210 may be generated. The report 210, or other output of the analytic or other processing steps, may be presented to the user via the user engine 202. In step 428, the method 400 ends.

Figure 5:
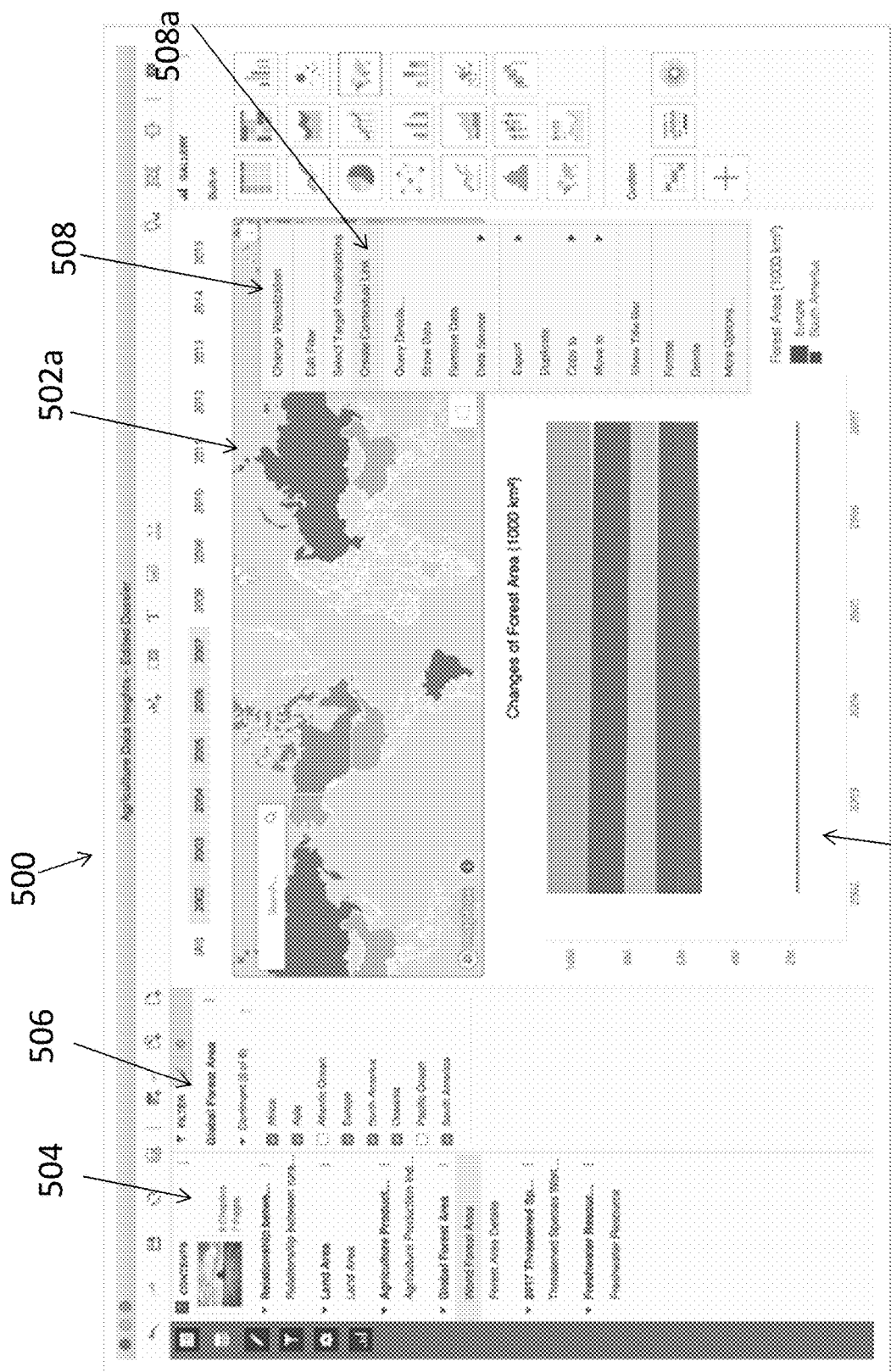
FIGS. 5-17 illustrate exemplary reports generated by the system and method of the present invention illustrating various features of the the system and method of the present invention.

FIG. 5 illustrates a report 500 generated by the system and method according to certain exemplary embodiments of the present invention. As illustrated in FIG. 5, the report 500 includes one or more containers 502a, 502b, ... 502n (where n is an integer greater than or equal to 1). The containers or frames include a visualization of one or more datasets selected by the user, as described above with respect to FIGS. 1-4. The data sets may be visualized as a chart, pie chart, graph, list, etc. For example, container 502a includes a map visualization. In the specific example illustrated in FIG. 5, the map in container 502a illustrates a visualization of global forest area. Container 502b includes a graph visualizing user-selected data. Again, in the specific example illustrated in FIG. 5, the graph illustrates changes in forest area over time.

The report (dossier) 500 also includes a contents menu 504, listing chapters 504a within the dossier 502. Additionally, the report 502 includes a filter menu 506. The filter menu 506 includes one or more selectable data filters applicable to the one or more data containers in the report 502. For purposes of the present disclosure, a filter is a part of a report/dossier that screens data in a data source to determine whether the data should be included or excluded from the calculations of the report/dossier results. When a dossier/report is created, data is pulled from a data source into the report/dossier and results of data calculations are displayed in the visualizations in the data containers. The user is able to filter the data displayed in a report/dossier to display only the information the user wants. For example, the user can filter data based on the values (or elements) of an attribute. For example, the customer attribute contains values that represent individual customers. The user can choose to display income data only for the customers that the user is interested in. Also, the user can filter data based on a value of a metric. For example, the can filter the data to show sales numbers for products whose current inventory count falls below a certain level, or data for the top 5% of performers on a sales team.

For example, in the exemplary report 502 illustrated in FIG. 5, the filter is based on continents. As shown the user has selected several contents, which are correspondingly highlighted in the map visualization in data container 502a. The chart in data container 502b includes the same filtered continents.

In accordance with certain exemplary embodiments of the invention, the report 502 is illustrated in an authoring interface. That is, the report 502 is shown as in the designer's dossier report building interface. With the present invention, the designer/author is able to create a contextual link to another visualization/page/chapter within the current report 502 or to another, separate dossier. To create the contextual link, the designer/author clicks on a visualization in one of the data containers, which will then present a context menu 508 listing options for editing the data container. For purposes of the present description a contextual link is a way to navigate to a different dossier without losing contexts, since the filter conditions would be passed as well As is illustrated in FIG. 5, one of the options is a "Create Contextual Link" option 508a.

Figure 6:
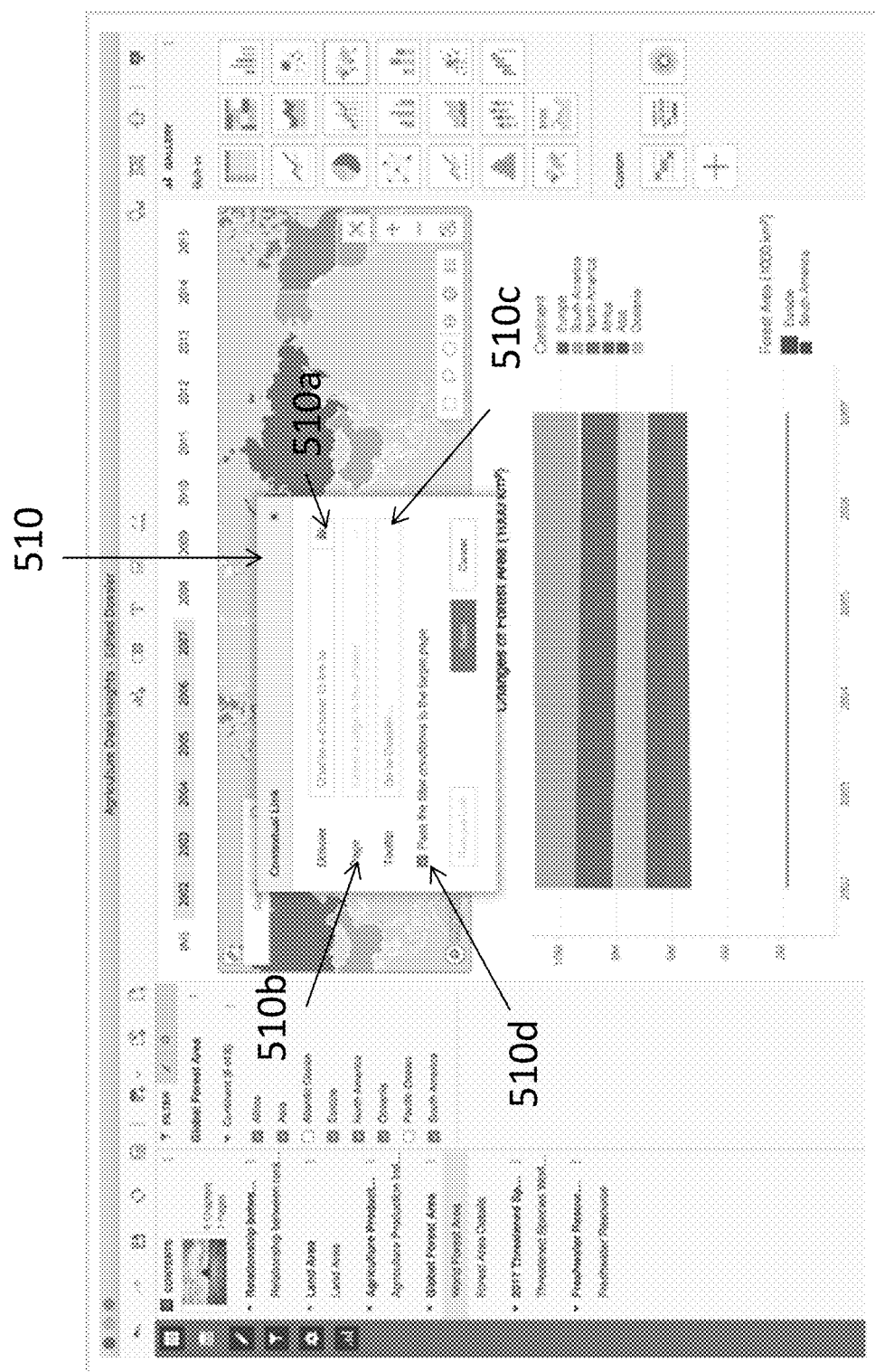

Once the user (i.e., author) selects the "Create Contextual Link" option 508a, the user will then need to decide to where the link should be created. That is, the user must select a target dossier. Thus, as illustrated in FIG. 6, a "Contextual link" box 510 will be presented to the user (an enlarged view of the "Contextual link" box 510 is illustrated in FIG. 7A). The "Contextual link" box 510 will include a dossier selection prompt 510a, which allows the user to browse and select a target dossier from one or more available dossiers, a page selection prompt 510b, which allows a user to select a specific page within the targeted dossier, and a tool tip prompt 510c, which includes information regarding the selected object. When user (i.e., author) hovers on the target visualization, they can see the tooltip. An example would be FIG. 14. You can see the sentence "Go to Forest Area Details" in the pop-over tooltip. This information is input by the users in 510c when configuring the link.

The user can select whether to pass filter conditions from the source dossier to the target dossier by checking or unchecking the "Pass the filter conditions to the target page" box 501d. Then, turning to FIG. 7, the user will need to decide how to deal with prompts. This means that the user can choose a way to answer the prompts. A prompt is a question the system presents to a user when a report is executed. How the user answers the question determines what data is displayed on the report when it is returned from your data source.

A user (i.e., report designer/author) can include one or more prompts in any report/dossier. Prompts are an effective tool to:

Allow each user who executes the report to request individualized sets of data from your data source when he answers the prompts and runs the report. Effectively, each user creates a filter for the report;

Allow the report designer to create a smaller number of reports overall, using more inclusive objects, rather than having to create numerous, more specific reports that are individualized to each analyst;

Allow the report designer to ensure that the objects on a report are the latest available objects in the project. This is possible using a search object in a prompt. When a user launches a prompt by running a report, the search object retrieves the latest objects that fit the search criteria the report designer defined. Thus, no matter when the prompt was created, each time a user executes the report, the user chooses prompt answers from a list of the most up-to-date objects available in the project, including objects that may not have existed when the prompt was created; and Allow users to keep the objects on their saved reports up-to-date. Users can save a prompted report so that the objects within the prompt remain connected to the original objects within the project that they were originally based on when the prompt was created. If objects are modified or deleted in the project, the report can reflect those changes the next time the prompted report is run.

The "choose prompt" and "answer prompt" features define the prompt to be answered and how to apply prompt answers to it, if the target contains prompts. A list of the prompts in the target is provided. For each prompt, the user selects a prompt answer method. For example, a prompt can use the existing prompt answers from the source, can be run so that the user must answer it, or can be answered with the object selected in the source.

For each prompt in the target (the report or document being executed from the link), the user must select a prompt answer method, which is how to answer the prompt. The user can also specify how to answer any other prompts that are not listed. These can be prompts that are created as the result of an answer to one of the original prompts in the target, such as a prompt-in-prompt answer. They can also be prompts added to the target later, after the link is created. These prompts are listed as the "Any other prompt" option in the list of prompts in the interface.

The following exemplary prompt answer methods are briefly described.

1. Prompt user:

When the target is executed, the user is prompted to provide answers manually. For example, the Regional Revenue report links regions to another report called Revenue by Category, which is prompted for regions. A user right-clicks Mid-Atlantic on the Regional Revenue report, and selects the link to the Revenue by Category report. The regional prompt is displayed, although a region was selected on the source report. The Prompt user prompt method does not pass information to the target report, so the user must answer the prompts manually.

2. Use the same answer from the source prompt:

The same prompt answers that were used to execute the source are used in the target. For example, the Prompted Regional Revenue report links regions to another report called Revenue by Category. Both reports contain the same prompt, which prompts the user to select the regions to display on the report. A user executes the Prompted Regional Revenue report and selects Mid-Atlantic, Northeast, and Southeast when prompted. The user right-clicks Mid-Atlantic and selects the link to the Revenue by Category report. The Revenue by Category report displays data for all three regions, although only one region was selected in the link.

3. Use the selected object as the answer:

The object selected in the source is passed to the prompt in the target. If this object does not answer the target prompt, the "Empty answer" method is used. That is, the prompt is not answered, unless it is required, in which case the user is prompted.

4. Use the default answer:

The prompt is answered by the default prompt answer for the prompt in the target. If the target prompt does not have a default answer, the Empty answer method is used. That is, the prompt is not answered, unless it is required, in which case the user is prompted.

For example, continuing with the same Regional Revenue and Revenue by Category reports described above, this time, however, the "Default answer prompt" method is used in the link, and the regional prompt has a default answer of Central. When a user right-clicks Mid-Atlantic on the Regional Revenue report, the Revenue by Category report displays data for Central.

5. Ignore the prompt:

The prompt in the target is ignored, which means that the prompt is not answered. No prompt answer is provided from the source and the user is not prompted to provide answers.

As is more clearly illustrated in FIG. 7A, the contextual link box 510 includes the dossier selection prompt 510a that allows the user to browse available dossiers and then select a target dossier from the available dossiers. Once the target dossier is selected, the user can select a specific page within the target dossier using a drop down menu in the page selection prompt 510b.

As noted above, the contextual link box 510 also includes a "Choose prompt" option 510e. The "Choose prompt" option 510e includes a list of selectable prompt options 510f that provide a method for passing data between linked pages/dossiers. The prompts allow a user to select data to be linked at the time of linking the pages/dossiers and allow the user to interact with filters. The contextual link box 510 further includes an "Answer prompt" option 510g. Specifically, if there are prompts in the target dossier, the user (i.e., author/designer) must determine how to answer the prompts. For example, the system provides five ways for the user to answer a prompt including: (1) prompt user; (2) use the same answer from the source prompt; (3) use the selected object as the prompt answer; (4) use a default answer; and (5) ignore the prompt.

Once the user has completed selecting options in the contextual link box 510, the user selects the "Save" option 510h, which returns the user to the dossier as illustrated in FIG. 5.

Figure 7:
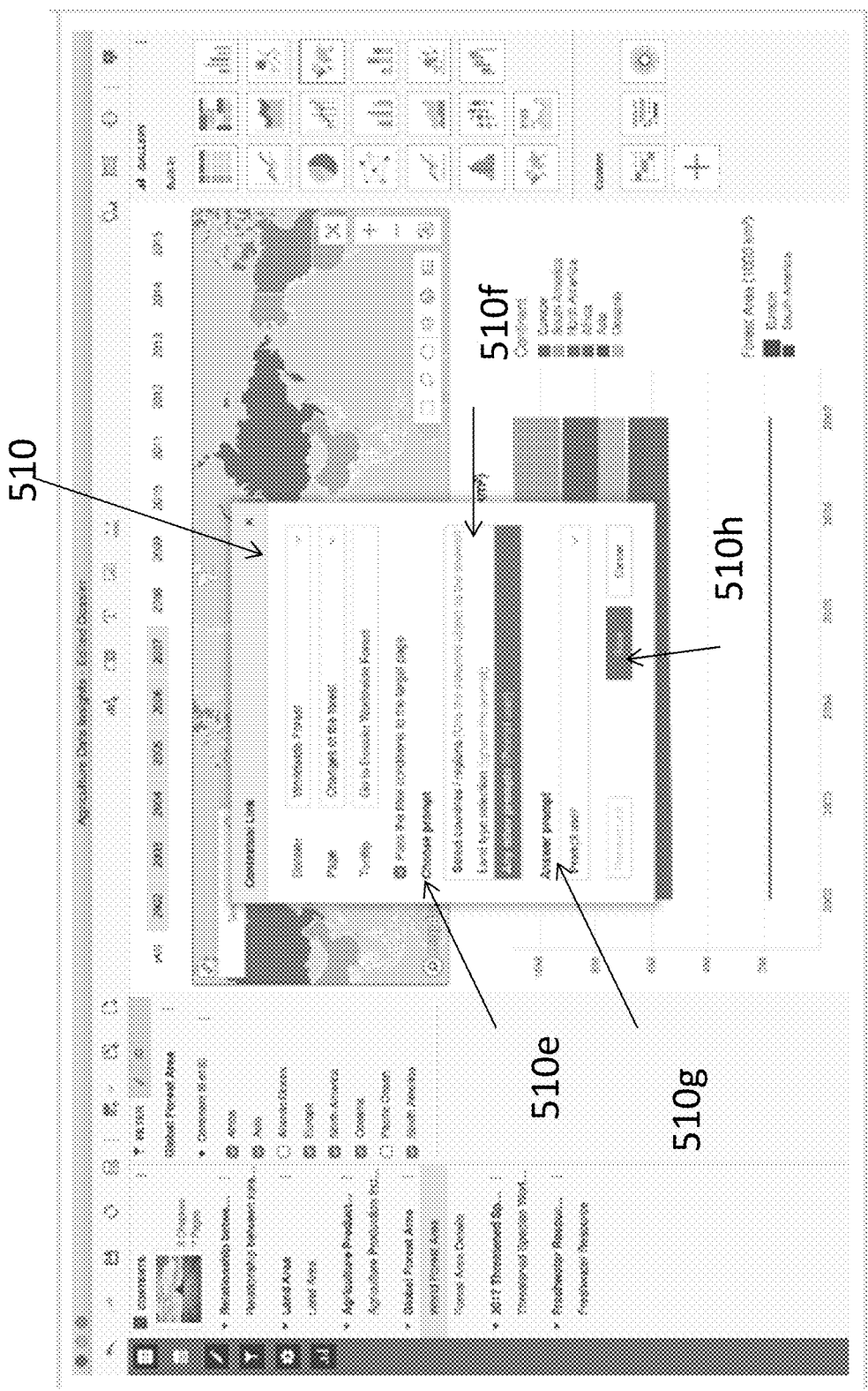
Figure 8:
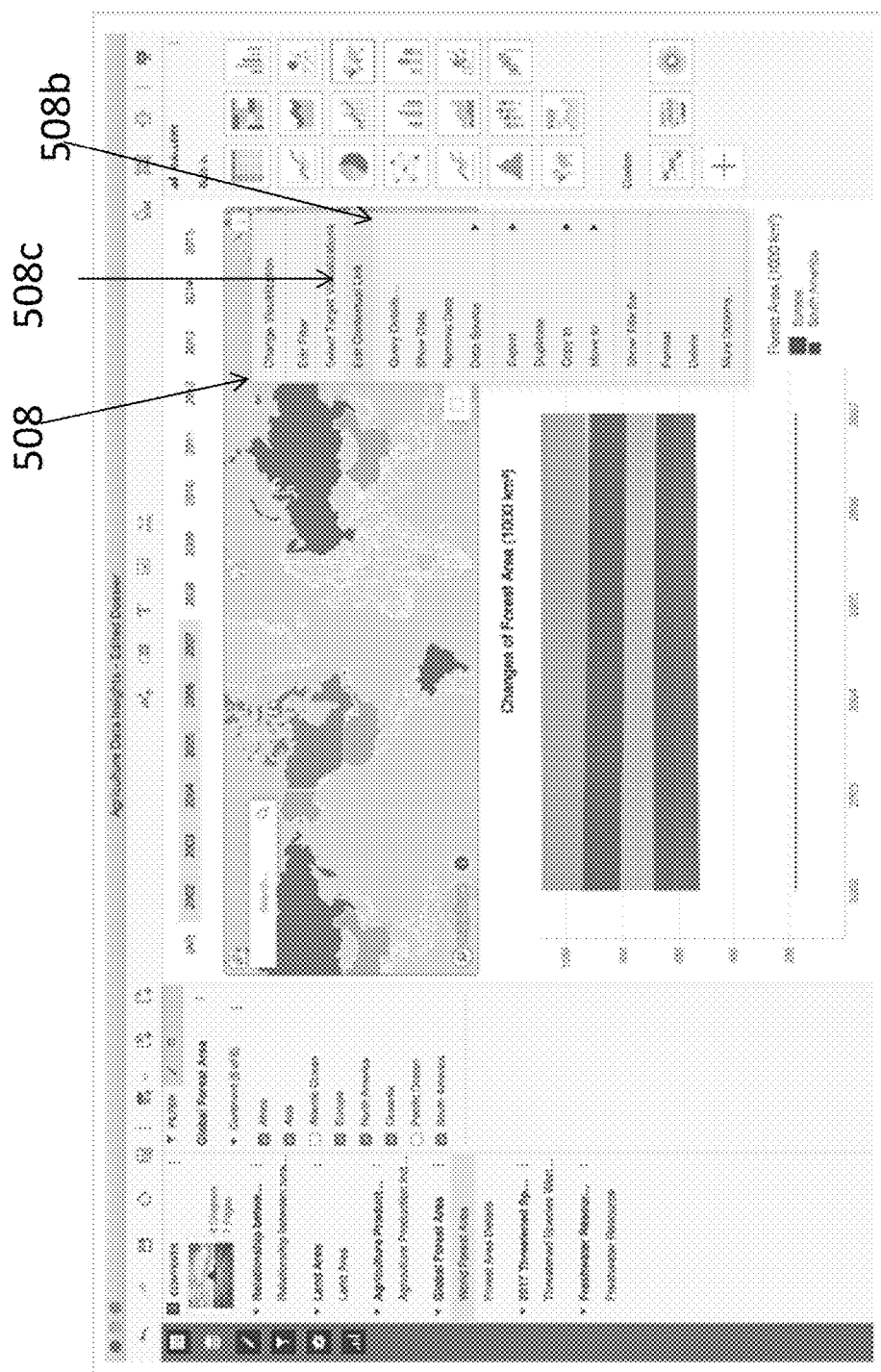

As is illustrated in FIG. 8, once the contextual link is created between the source dossier and the target dossier, the "Create Textual Link" option 508a will be replaced with an "Edit Contextual Link" option 508b. The user may select the "Edit Contextual Link" option 508b if the user wishes to make any changes to the existing contextual link. Upon selection of "Edit Contextual Link" option 508b, the user will again be presented with the "Contextual link" box 510 illustrated in FIGS. 6 and 7.

Figure 7A:
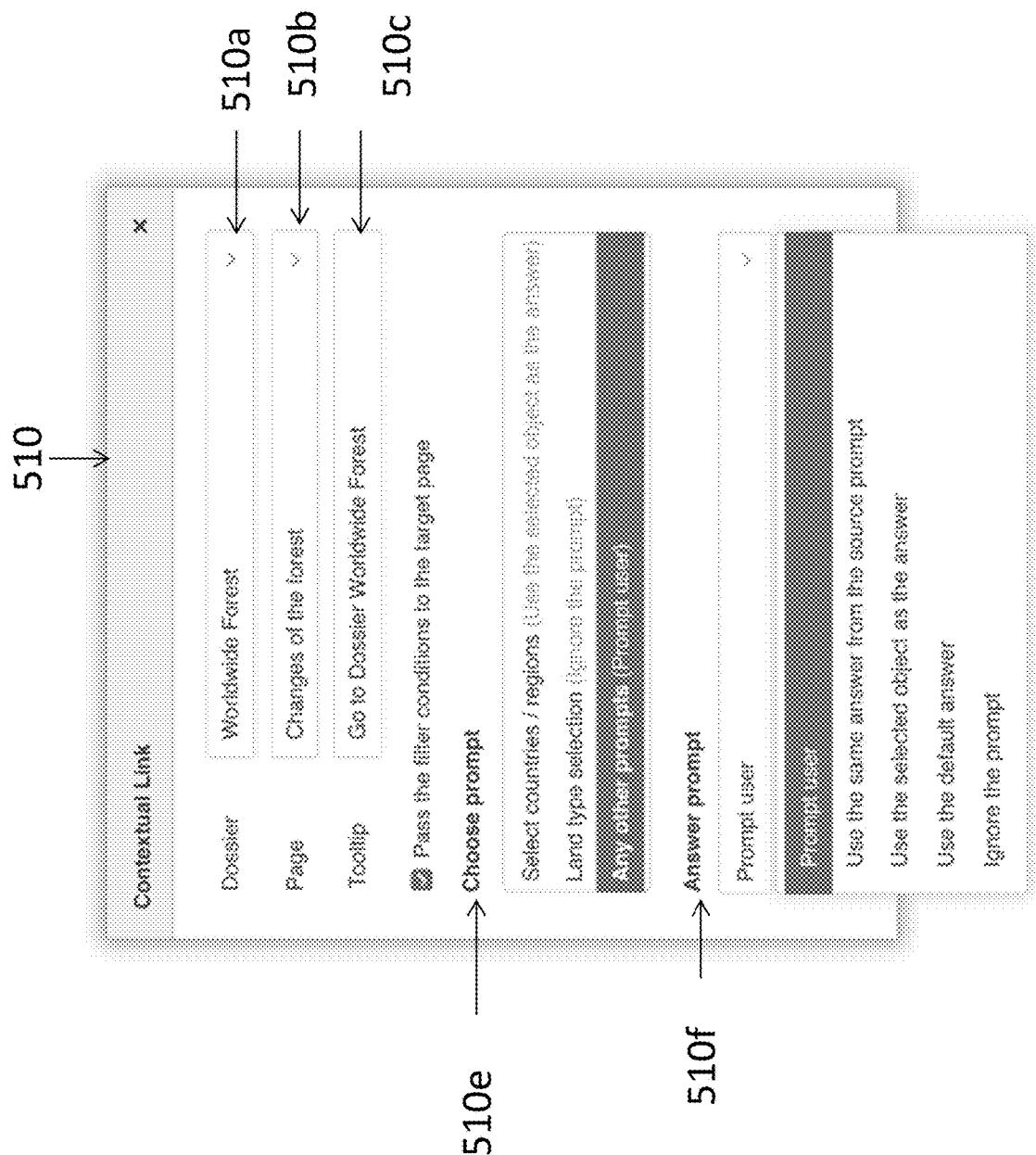
Figure 9:
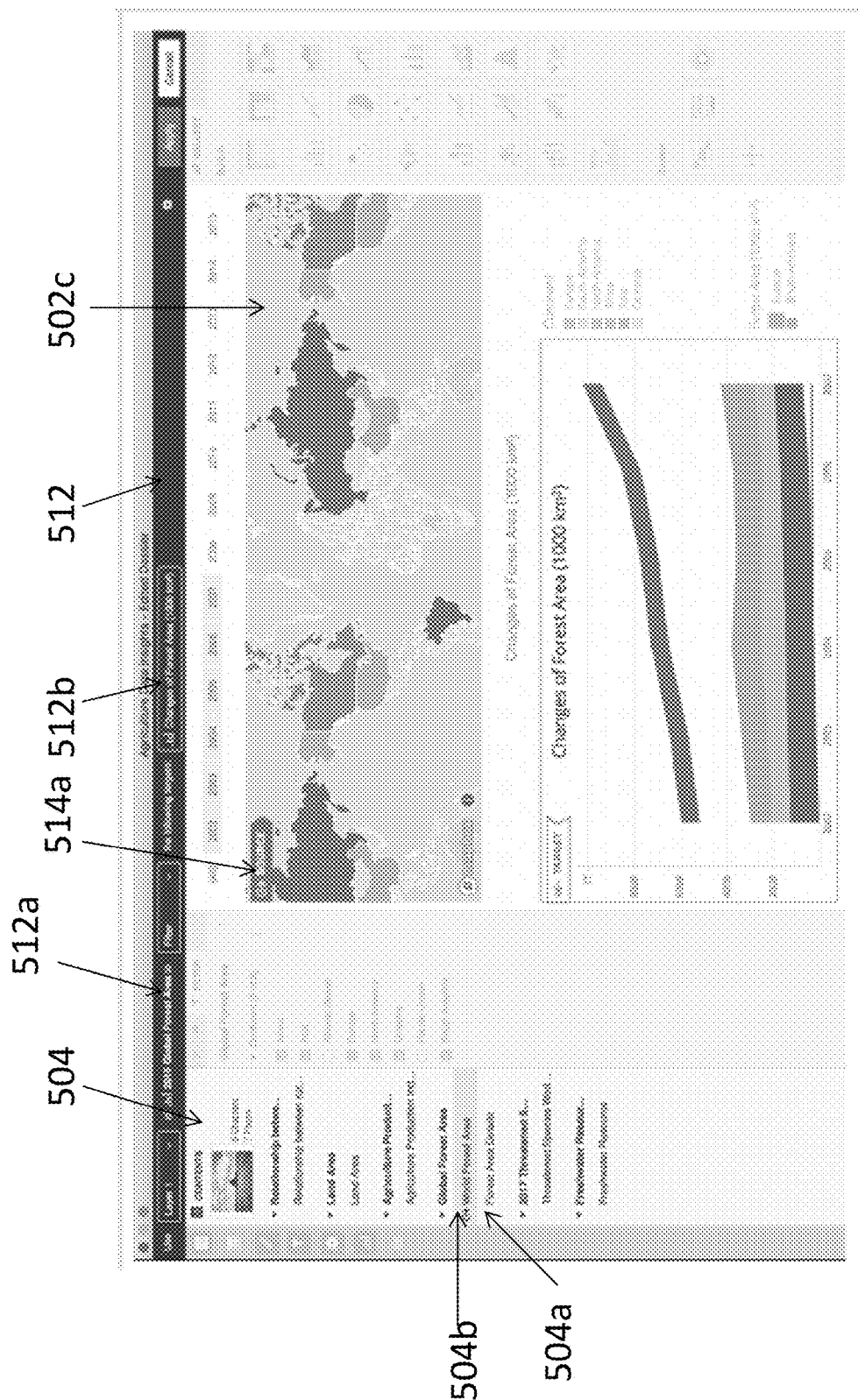
Figure 10:
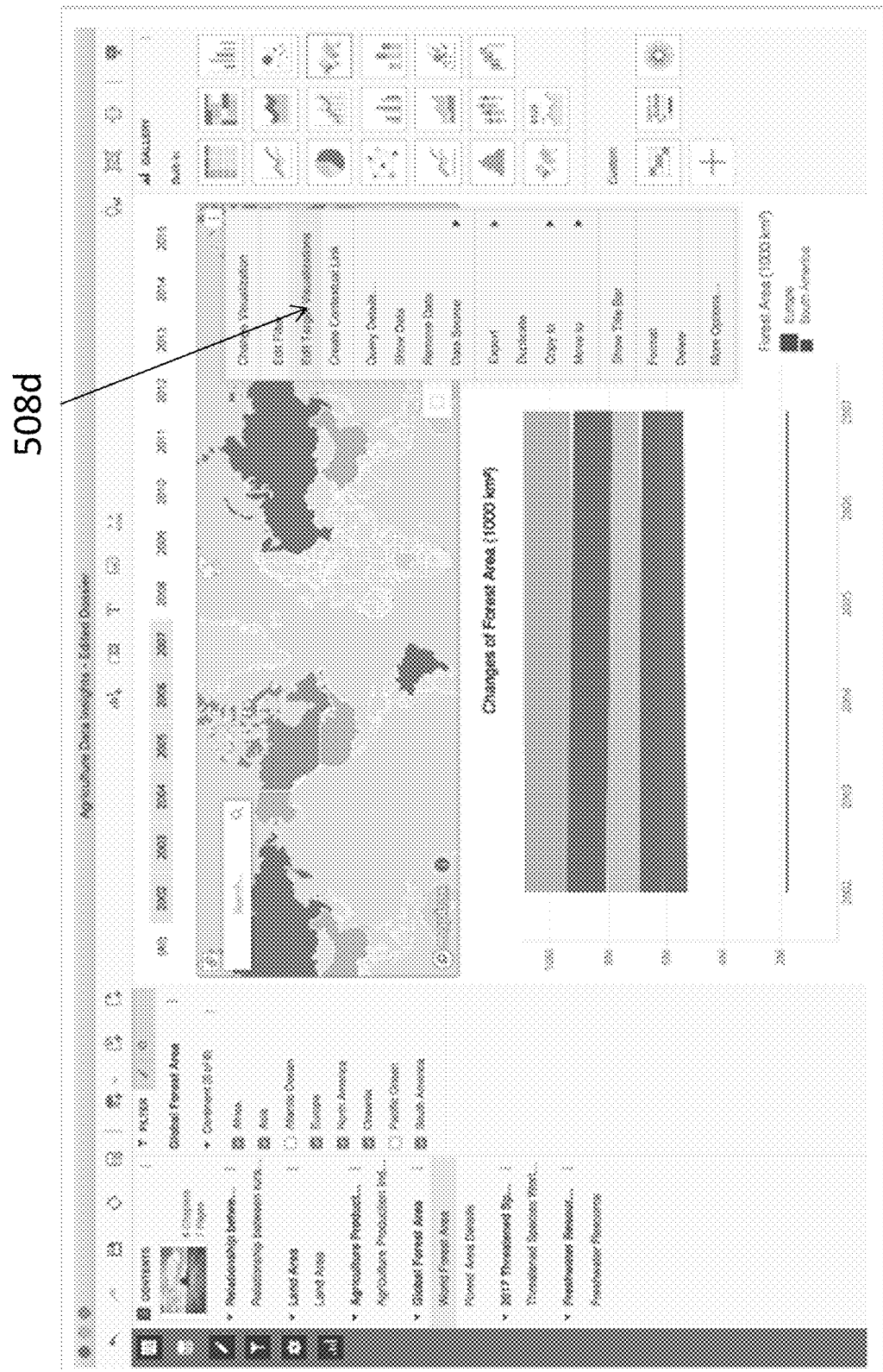

FIGS. 5-7 disclose the manner in which a user can create a contextual link from a source dossier to another separate dossier. FIGS. 8-10, described below, disclose the manner in which the user can create a contextual link within the source dossier itself. Specifically, the user is able to link from a source visualization to another visualization within the same dossier.

The context menu 508 also includes a "Select Target Visualization" option 508c. When the user selects the "Select Target Visualization" option 508c, the user can choose target visualizations on the same page or in another page. To select visualizations from another page within the dossier, the user can select one of the pages/chapters 504a from the contents menu 504. As is illustrated in FIG. 9, the user will be presented with the potential target visualizations from the selected page/chapter 504a. A selection bar 512 will be presented along a top of the dossier 500. The selection bar 512 will display the source dossier 512a (e.g., in the exemplary embodiment illustrated in FIG. 8, the page "Global Forest Area" is listed). The displayed source visualization 502c will include a source icon 514a. The same source icon 504b will also be displayed in the contents menu 504. The selection bar 512 will also display the selected target 512b (e.g., in the exemplary embodiment illustrated in FIG. 9, the target visualization "Changes of Forest Area" was selected for linking). When the link is created, the datasets and any filters selected in the filter panel 506 will carry over to the linked page within the dossier 500. As illustrated in FIG. 10, once the target visualizations are selected, the "Select Target Visualization" option 508c will change to an "Edit Target Visualization" option 508d in the context menu.

Figure 11:
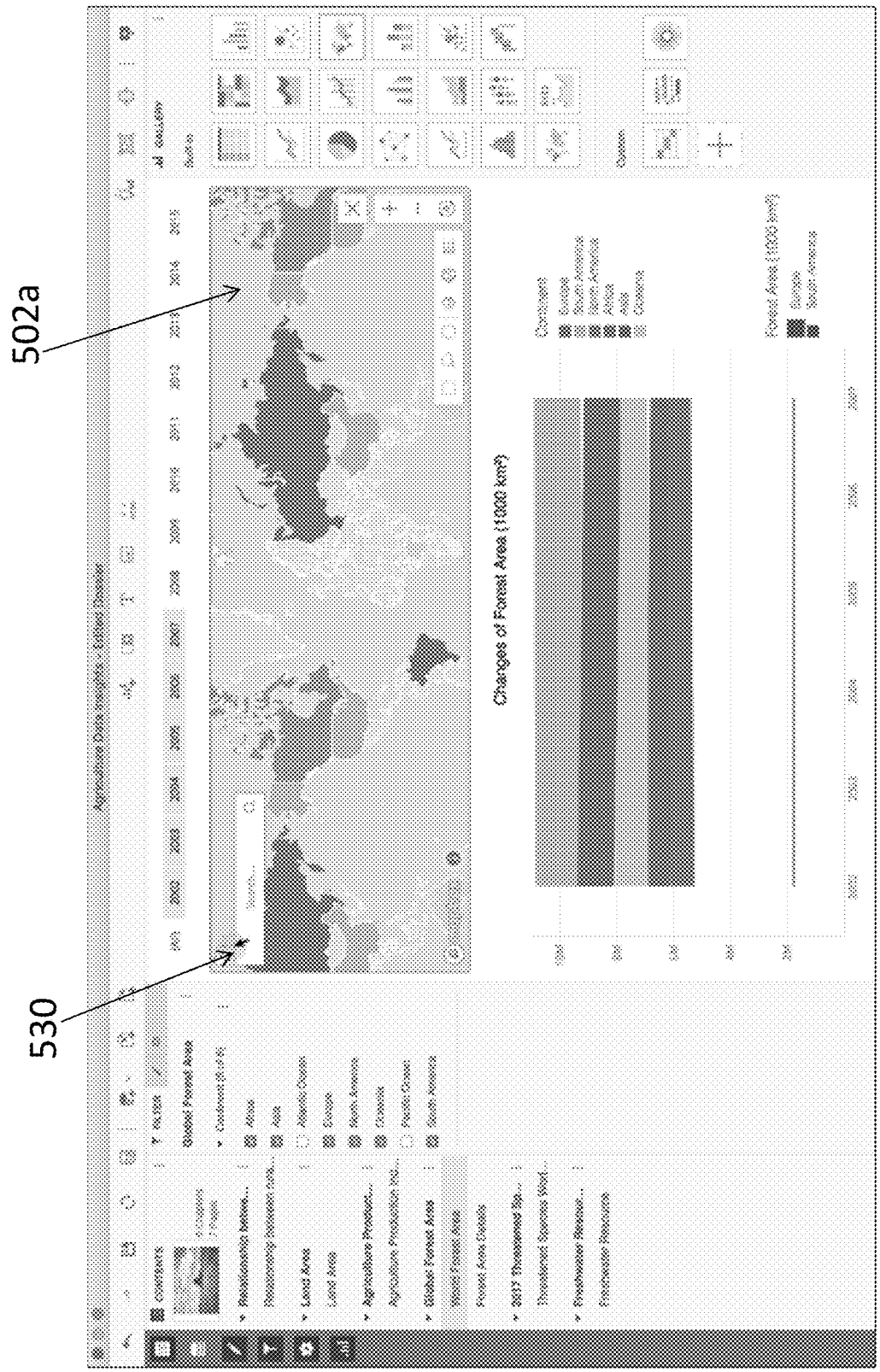

Once the user has completed the contextual link, the user is then returned to the initial dossier page, as illustrated in FIG. 11. Now, when the user hovers on one of the source visualizations (e.g., in the embodiment illustrated in FIG. 11, the user is illustrated as hovering over source visualization 502a), a link icon 530 is displayed. The link icon 530 provides the user another entry point to access the "Edit Contextual Link" option in the context menu 508. By selecting the link icon 530, the user reopens the contextual link box 510, as is illustrated in FIGS. 7 and 7A.

Figure 12:
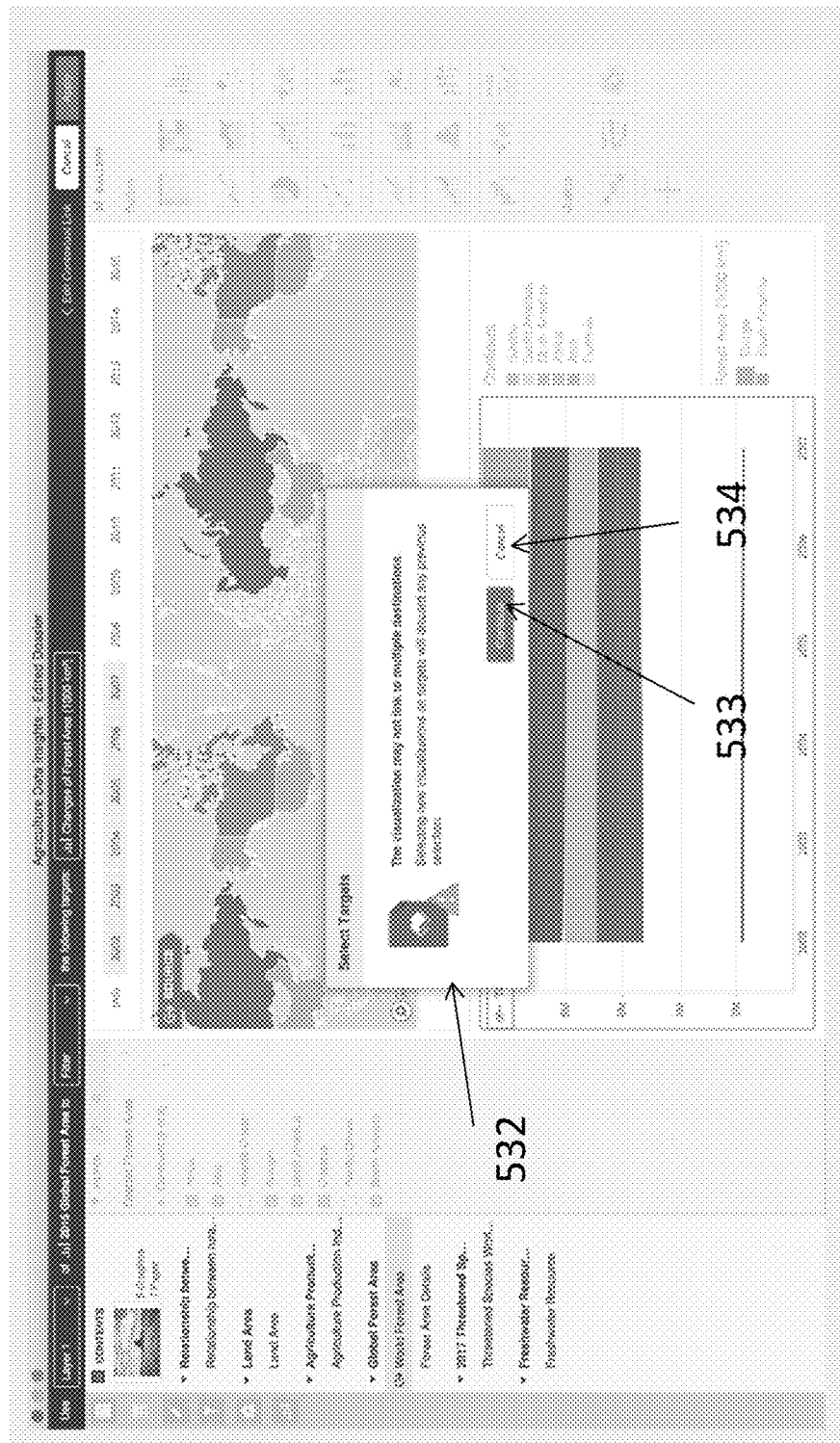

Once the contextual link is created as detailed above, the user cannot link the source visualizations to another page/dossier. That is, the system does not permit a visualization to be linked to multiple destinations. Should the user attempt to link one or more of the visualizations to another page or dossier, since there is already a contextual link created, the system will display a warning message 532 to the user. As is illustrated in FIG. 12, the warning message will indicate, for example: "The visualization may not link the multiple destinations. Selecting new visualizations as targets will discard any previous selection." The user will be given the options to continue 533 with the selection or cancel 534 the action.

Figure 13:
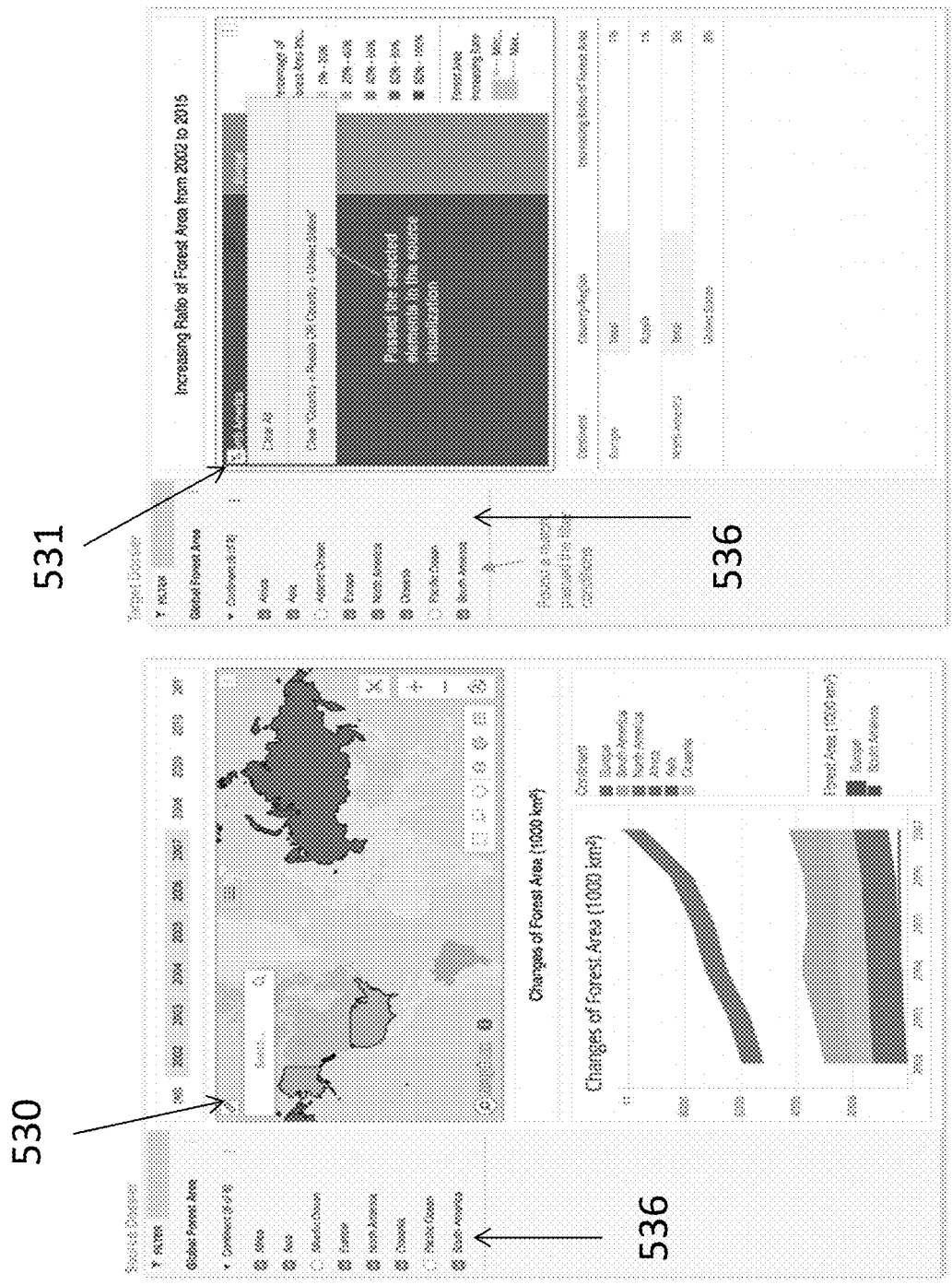

As detailed above, when a contextual link is created, not only will the data from the source visualization pass to the target page/dossier, filter conditions are also able to be passed. FIG. 13 provides a side-by-side illustration of a visualization in a source dossier and a visualization in a target dossier. Specifically, the target dossier illustrated in FIG. 13 includes a target dossier after the contextual link has been created. As noted above, when the contextual link has been created, the link icon 530 will appear in the source visualization. When the contextual link is created, by default, the selected elements in the source visualization are passed to the view filter of the target visualization. Furthermore, when there is a match, the filter conditions in the filter panel are passed. That is, if the filter's name is the same in the source dossier and the target dossier, the selections under the filter will be passed. In the example in FIG. 13, a match was found so the filter conditions 536 were passed from the source visualization to the target visualization. The user is then able to, if desired, clear these filters. By clicking on a filter icon 531 in the target dossier, the user will be provided with a drop down option 538, which allows the user to clear the filters.

Figure 14:
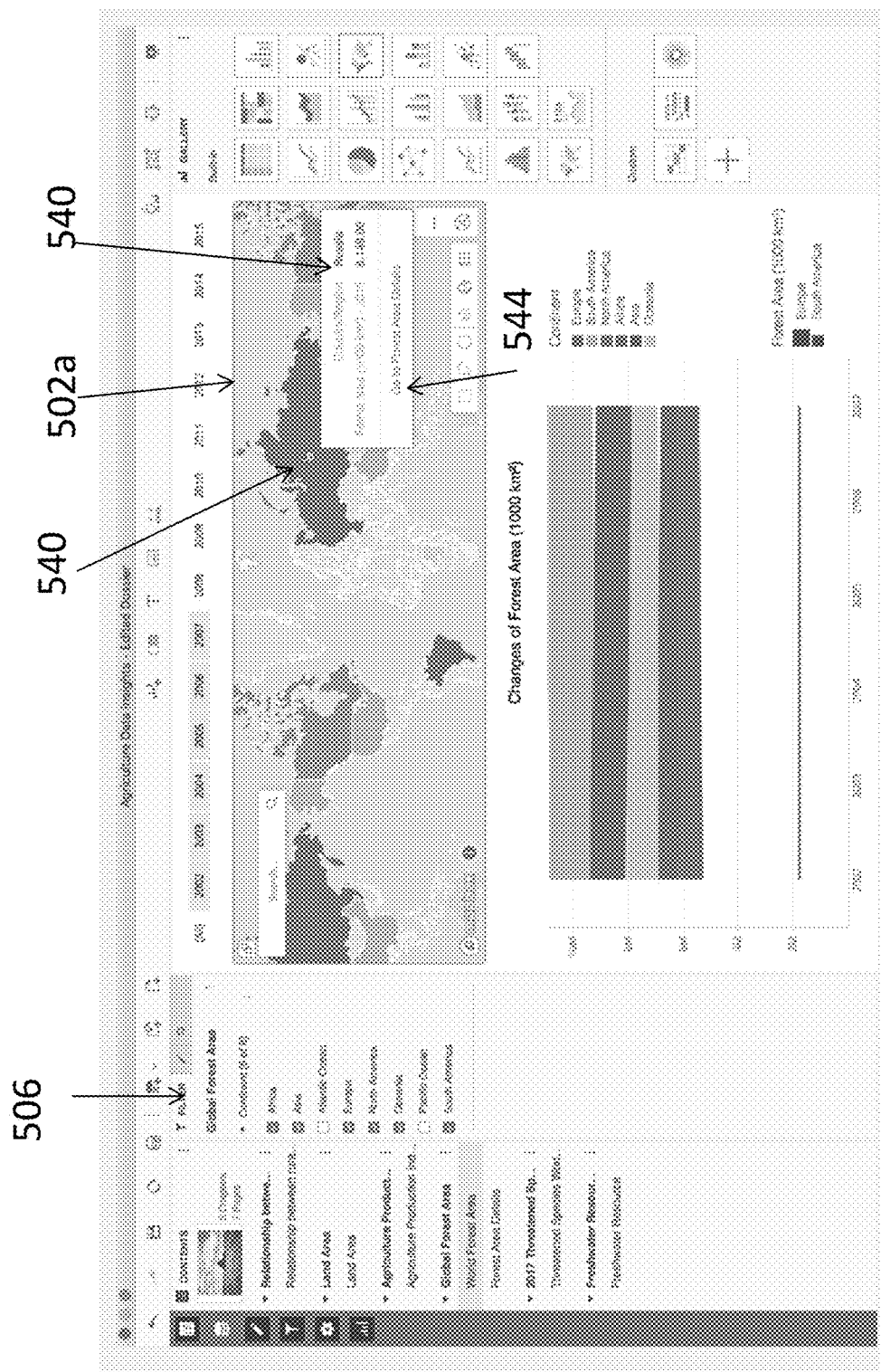
Figure 15:
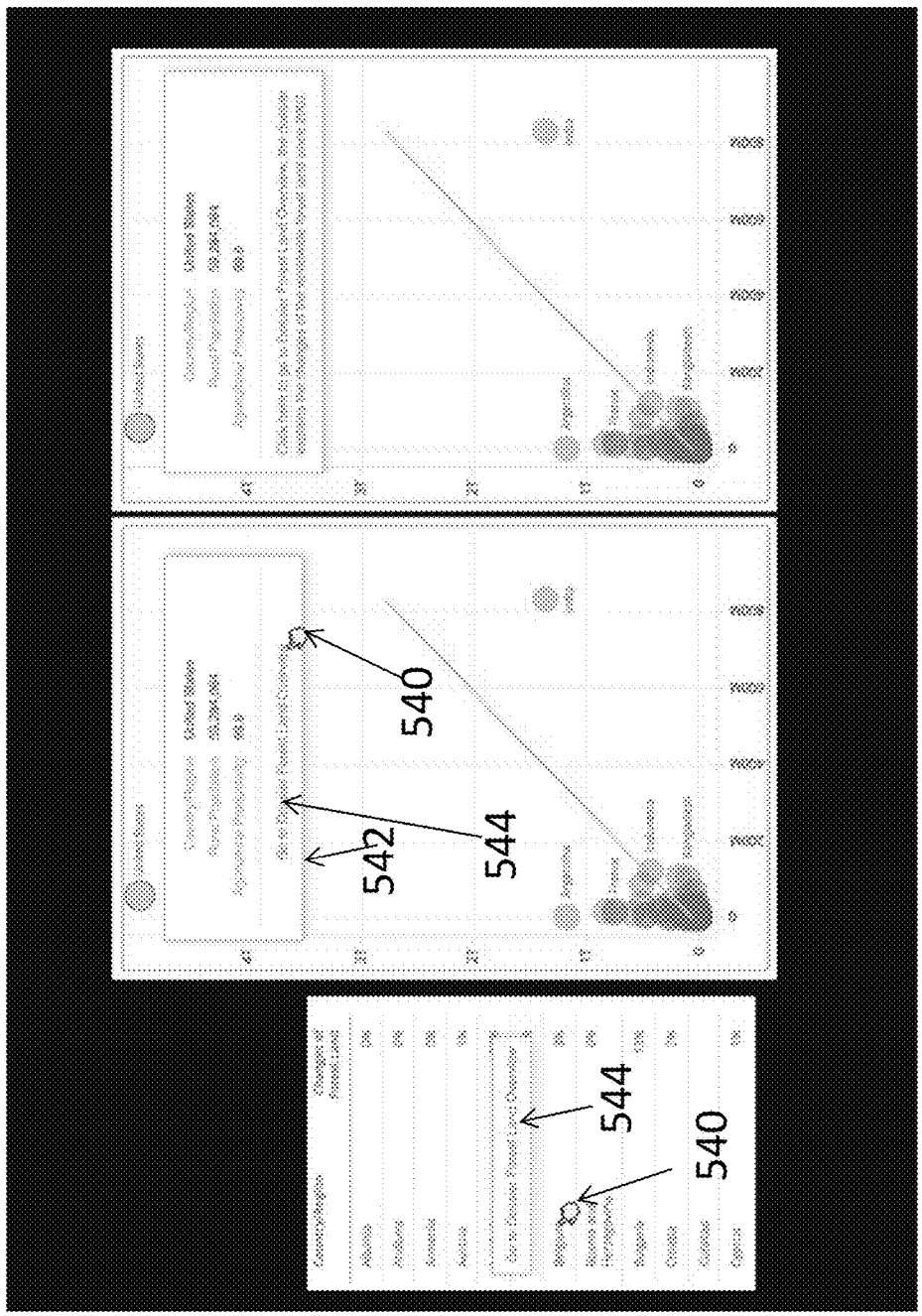

Furthermore, FIG. 14 illustrates a source visualization after a contextual link has been created. In the source visualization illustrated in FIG. 14, a world map is provided in visualization 502*a*. The filter panel 506 illustrates that all of the continents have been selected. Then by hovering the mouse 540 over one of the highlighted countries (e.g., in FIG. 14, Russia) the system will display link information in a context menu/tool tip 542. The context menu/tool tip 542 will include a selectable "Go To" option 544. For example, the "Go To" option 544 in FIG. 17 indicates "Go To Forest Area Details," which will, when selected by the user, direct the user to a linked target page. Similarly, in grids, charts and tables, as illustrated in, for example, FIG. 15, the user simply hovers the mouse 540 over a portion of the visualization to see the context menu/tool tip 542. As is illustrated in the examples in FIG. 15, the "Go To" option 544 is "Got To Dossier Forest Land Overview." In this instance, when the user selects the the "Go To" option 544, the user is directed to another dossier linked to the source dossier. If the visualization is linking to some other visualizations within the current dossier, then the selectable "Go To" option 544 would be "Go to Page "Name." If the visualization is linking to some other visualizations in another dossier, then the selectable "Go To" option 544 would be "Go to Dossier "Name."

Figure 16:
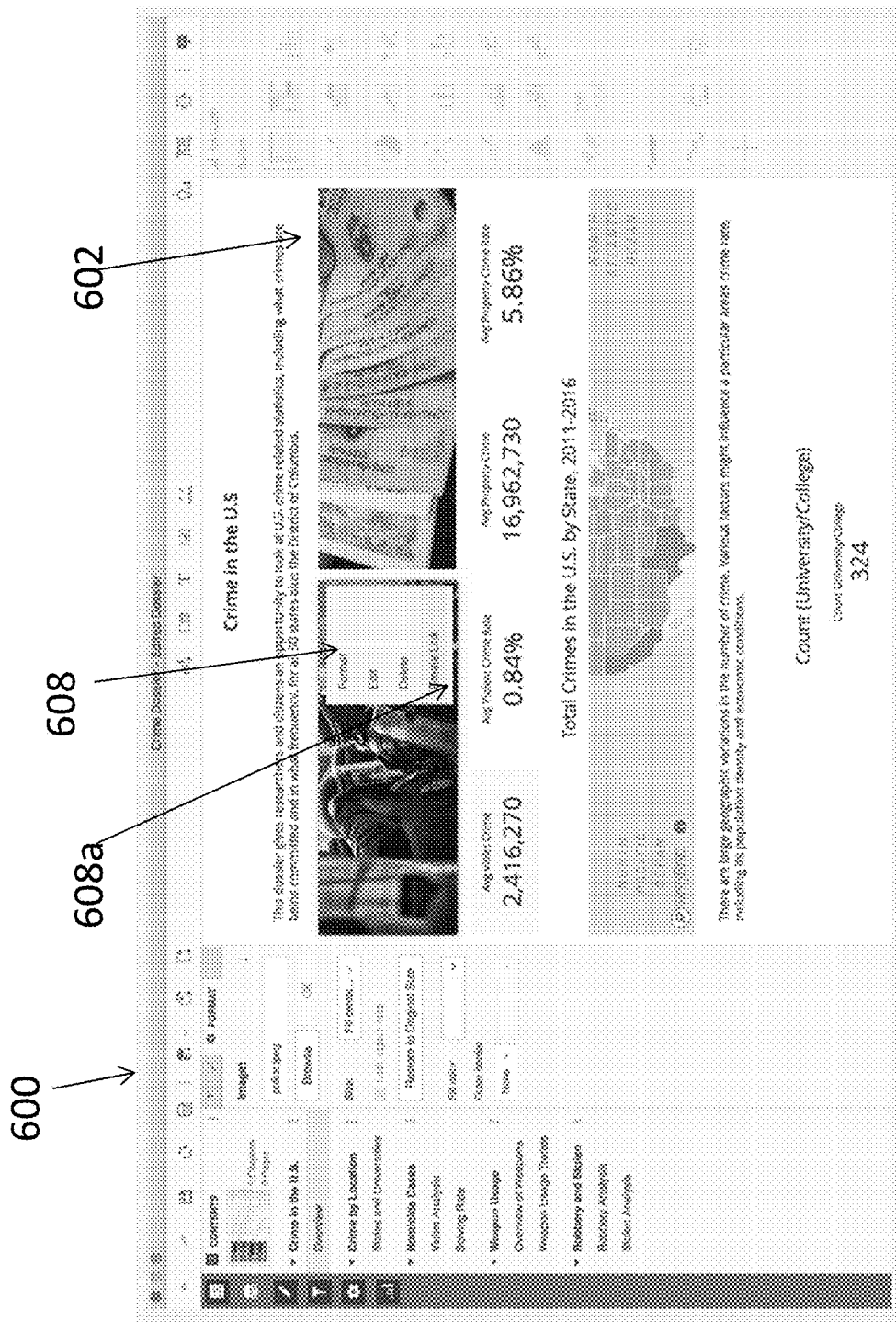
Figure 17:
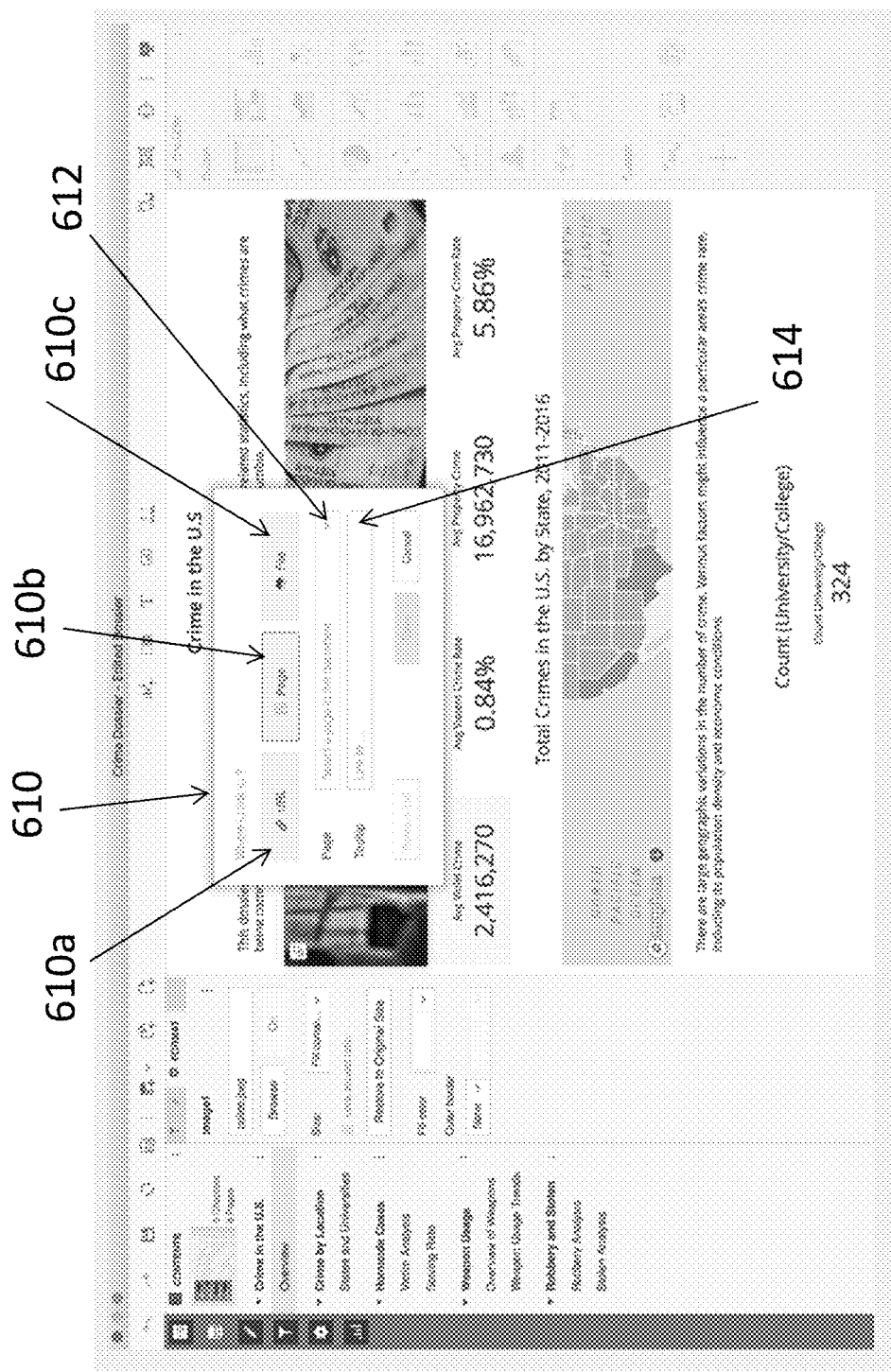

FIG. 16 illustrates another manner in which a user can create a contextual link. Specifically, FIG. 16 illustrates a source visualization 602 in a dossier. The user can simply click on an image or a text box on the page. The system will then provide a context menu 608, including a "Create Link" option 608*a*. Once the user selects the "Create Link" option 608*a*, then, as is illustrated in FIG. 17, an edit panel 610 is presented to the user. The user can select to link to a URL 610*a*, a page within the current dossier 610*b* or another dossier 610*c*. The user can then type in the specific URL, page or dossier into a corresponding prompt 612 and similarly add a tool tip 614.

Accordingly, the present invention provides a report building system and method for business analytics that allows a user to narrow down the amount of data and, thus, increase productivity by linking pages and visualizations within and between one or more dossiers.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A computer-implemented method, comprising:
retrieving a dataset from a database;
creating a source report including a graphical representation of the dataset, the graphical representation of the dataset including a data container, and the graphical representation of the dataset comprising a source visualization;
displaying the source report on a graphical user interface of a computing device;
creating a contextual link between the graphical representation of the dataset and another graphical representation of data within the source report or within another separate report, the another graphical representation of data comprising an individually selected target visualization, the contextual link comprising a data filter set in the source visualization that is transferred to the individually selected target visualization when the contextual link is created, wherein a user is provided with two options for creating the contextual link including:
initiating the contextual link through a drop down menu; and
initiating the contextual link by selecting an image or a text box in the source report; and
displaying a user-selected create contextual link option, the create contextual link option comprising:
a dossier selection prompt configured to allow the user to browse and select a target report;
a page selection prompt configured to allow the user to select a specific page within the target report;
a tool tip prompt;
a choose prompt option including a list of user selectable prompt options configured to allow the user to select data to be linked and to interact with the data filter set, the list of user selectable prompt options comprising:
prompt user, which prompts the user to manually enter responses;
use a same answer from the source report in the target report;
use a selected object as a prompt answer;
use a default answer; and
ignore prompt; and
an answer prompt option that allows the user to determine how to answer each of the user selectable prompt options.

2. The method according to claim 1, wherein said creating a contextual link comprises selecting the target report, the target report including the source report or a separate report.

3. The method according to claim 1, wherein said creating the contextual link comprises setting whether to pass the data filter set in the source report to the target report.

4. The method according to claim 3, wherein said setting whether to pass the data filter set comprises selecting one or more data filters from a list of selectable data filters.

5. The method according to claim 1, further comprising displaying a link icon when the contextual link has been created.

6. The method according to claim 1, wherein the data filter set in the source visualization is transferred to only the individually selected target visualization when the contextual link is created.

7. The method according to claim 1, wherein the user is able to select which filter conditions from the data filter set are transferred to the individually selected target visualization.

8. The method according to claim 1, further comprising, after the contextual link is created, displaying an edit contextual link option configured to allow the user to make changes to the existing contextual link.

9. The method according to claim 1, further comprising preventing the source visualization from being linked to multiple target visualizations.

10. The method according to claim 1, wherein, when the contextual link is created, data and filter conditions are transferred from the source visualization to the target visualization.

11. A non-transitory computer processor-readable storage medium storing instructions configured for execution by a computer for:
retrieving a dataset from a database;
creating a source report including a graphical representation of the dataset, the graphical representation of the dataset including a data container, and the graphical representation of the dataset comprising a source visualization;
displaying the source report on a graphical user interface;
creating a contextual link between the graphical representation of the dataset and another graphical representation of data within the source report or within another separate report, the another graphical representation of data comprises an individually selected target visualization, the contextual link comprising a data filter set in the source visualization that is transferred to the individually selected target visualization when the contextual link is created, wherein a user is provided with two options for creating the contextual link including:
initiating the contextual link through a drop down menu; and
initiating the contextual link by selecting an image or a text box in the source report; and
displaying a user-selected create contextual link option, the create contextual link option comprising:
a dossier selection prompt configured to allow the user to browse and select a target report;
a page selection prompt configured to allow the user to select a specific page within the target report;
a tool tip prompt;
a choose prompt option including a list of user selectable prompt options configured to allow the user to select data to be linked and to interact with the data filter set, the list of user selectable prompt options comprising:
prompt user, which prompts the user to manually enter responses;
use a same answer from the source report in the target report;
use a selected object as a prompt answer;
use a default answer; and
ignore prompt; and
an answer prompt option that allows the user to determine how to answer each of the user selectable prompt options.

12. A system, comprising:
a database storing a dataset;
a processor configured to:
create a source report including a graphical representation of the dataset, the graphical representation of the dataset including a data container, and the graphical representation of the dataset comprising a source visualization;
create a contextual link between the graphical representation of the dataset and another graphical representation of data within the source report or within another separate report, the another graphical representation of data comprises an individually selected target visualization, the contextual link comprising a data filter set in the source visualization that is transferred to the individually selected target visualization when the contextual link is created, wherein a user is provided with two options for creating the contextual link including:
initiating the contextual link through a drop down menu: and
initiating the contextual link by selecting an image or a text box in the source report; and
display a user-selected create contextual link option, the create contextual link option comprising:
a dossier selection prompt configured to allow a user to browse and select a target report;
a page selection prompt configured to allow the user to select a specific page within the target report;
a tool tip prompt;
a choose prompt option including a list of user selectable prompt options configured to allow the user to select data to be linked and to interact with the data filter set, the list of user selectable prompt options comprising:
prompt user, which prompts the user to manually enter responses;
use a same answer from the source report in the target report;
use a selected object as a prompt answer;
use a default answer; and
ignore prompt; and
an answer prompt option that allows the user to determine how to answer each of the user selectable prompt options; and
a graphical user interface configured to display the source report.

* * * * *